United States Patent [19]

Watkins et al.

[11] 4,044,387
[45] Aug. 23, 1977

[54] MAGNETIC HEAD SWITCHING SYSTEM

[75] Inventors: Lee A. Watkins, San Jose; Larry M. Jacob, Los Altos, both of Calif.

[73] Assignee: Sperry Rand Corporation, New York, N.Y.

[21] Appl. No.: 609,701

[22] Filed: Sept. 2, 1975

[51] Int. Cl.² .............................................. G11B 15/12
[52] U.S. Cl. ....................................... 360/61; 360/63
[58] Field of Search ............................. 360/62, 61, 63

[56] References Cited

U.S. PATENT DOCUMENTS

| 2,927,304 | 3/1960 | Paquin | 360/63 |
| 2,941,190 | 6/1960 | Lindley | 360/62 |
| 2,984,826 | 5/1961 | Reed | 360/63 |
| 3,092,817 | 6/1963 | Diamant | 360/62 |
| 3,810,135 | 5/1974 | Kawakami | 360/62 |

Primary Examiner—Jay P. Lucas
Attorney, Agent, or Firm—Gerald L. Moore

[57] ABSTRACT

A switching system for use with magnetic heads and providing protection for the read or write circuits while the other is being used and further substantially reducing any losses or distortion in the read signal when the circuit is switched to the read mode.

2 Claims, 4 Drawing Figures

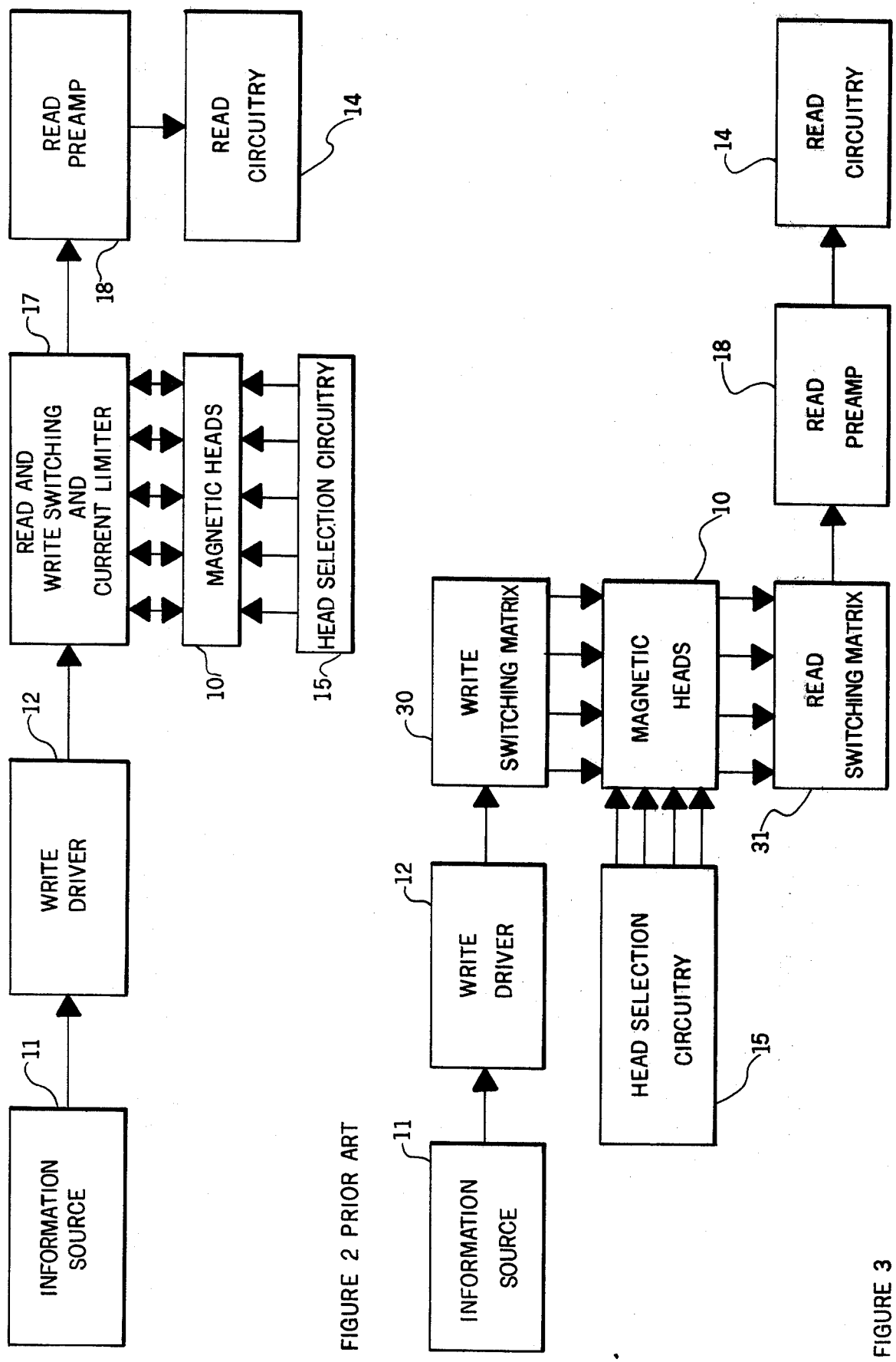

MAGNETIC HEAD SWITCHING SYSTEM

BACKGROUND OF THE INVENTION

In computer peripheral systems, as well as other applications, data is stored on a magnetizable medium such as a coated disc or tape by the proper energization of a magnetic head. The magnetic head includes a coil of wire surrounding a magnetic core which is disposed close to the medium so as to impress a portion of the magnetic flux generated (as a result of an electric current flowing through the windings) on the area of the magnetic medium immediately adjacent an air gap across which the flux can be varied. For recording, the direction of the flux is reversed to indicate a selected binary code.

As disclosed in the U.S. Pat. No. 2,927,304 issued on Mar. 1, 1960, in the name of James H. Paquin, the coil can be center-tapped and by switching between the ends of the coil halves and the center tap, the direction of flux generated can be reversed while maintaining the overall current level substantially constant. For reading back the information, the magnetic head is moved along the medium such that the coil is passed through the flux field caused by the medium for effecting an electric potential across the coil. This voltage is detected and interpreted to read the recorded information.

Naturally the magnitude of the voltage resulting in reading back the information is much less than that resulting from recording information. In the readback process a differential voltage in the coil is detected which results from the direction of magnetization of the medium over which the head is passed. Such signals are routinely quite small, i.e. on an order of magnitude of only one ten-thousandth that of the write signal. In the usual case, the readback signal is on the order of 1-10 millivolts thereby requiring substantial amplification prior to use and detection. It is therefore imperative that the write current circuit be as impedance and distortion-free as possible for proper detection of the signal.

However since the same coils are used for both reading and writing the information and since switching means must be provided for both selecting the direction of energization of each individual coil and for selecting the individual coils from a number of magnetic heads, there exists the possibility of considerable noise generation in the circuit and dissipation of the read signal. For instance in the switching of the current from one coil half to another for the writing process, there are generated voltage spikes in the write circuit which can pass into the read circuit. Such pulses of energy can serve to permanently damage any transistor amplifiers in the read circuit. Routinely a transistor can only withstand approximately 5 volts of reverse base-to-emitter voltage without breaking down and possibly causing permanent damage to the device. Frequently the voltage spikes resulting from the switching within the write circuit can reach 7 to 10 volts.

In addition by subjecting the read circuit to the back voltage of the write circuit, the speed of operation of the overall circuit is slowed. After a writing operation, the read amplifier and circuit in past devices must be afforded time to recover from being back biased before the reading sequence can be initiated. Thus the reaction time for the circuit is lengthened.

Thus in the past there has been utilized a diode limiter circuit which limits the signal swing the read circuit receives from the write circuit during the time the overall circuit is in the write mode for the protection of the amplifier. However, such diodes interject both noise and cause losses in the circuit so as to diminish the read voltage and inhibit the ability of the system to detect the data. It is the primary purpose of this invention to provide a circuit which diminishes the effect of the limiter circuit on the read voltage.

SUMMARY OF THE INVENTION

A switching circuit for controlling current flow between a write driver, a read circuit and a magnetic head for recording on and reading data from a recording media wherein first and second switching circuits are connected between the magnetic head and the write driver and the read circuit respectively, with means for alternately turning on these switching circuits for writing and reading information whereby during the time a circuit is switched on the current between the magnetic head and that respective circuit need not pass through the switching circuit currently turned off so as to cause resulting attenuation and distortion of the signals.

DESCRIPTION OF THE DRAWINGS

FIG. 2 shows a prior art magnetic head switching circuit in block diagram form.

FIG. 3 shows the present invention in block diagram form; and

DESCRIPTION OF THE INVENTION

Prior Art

Figure 1:
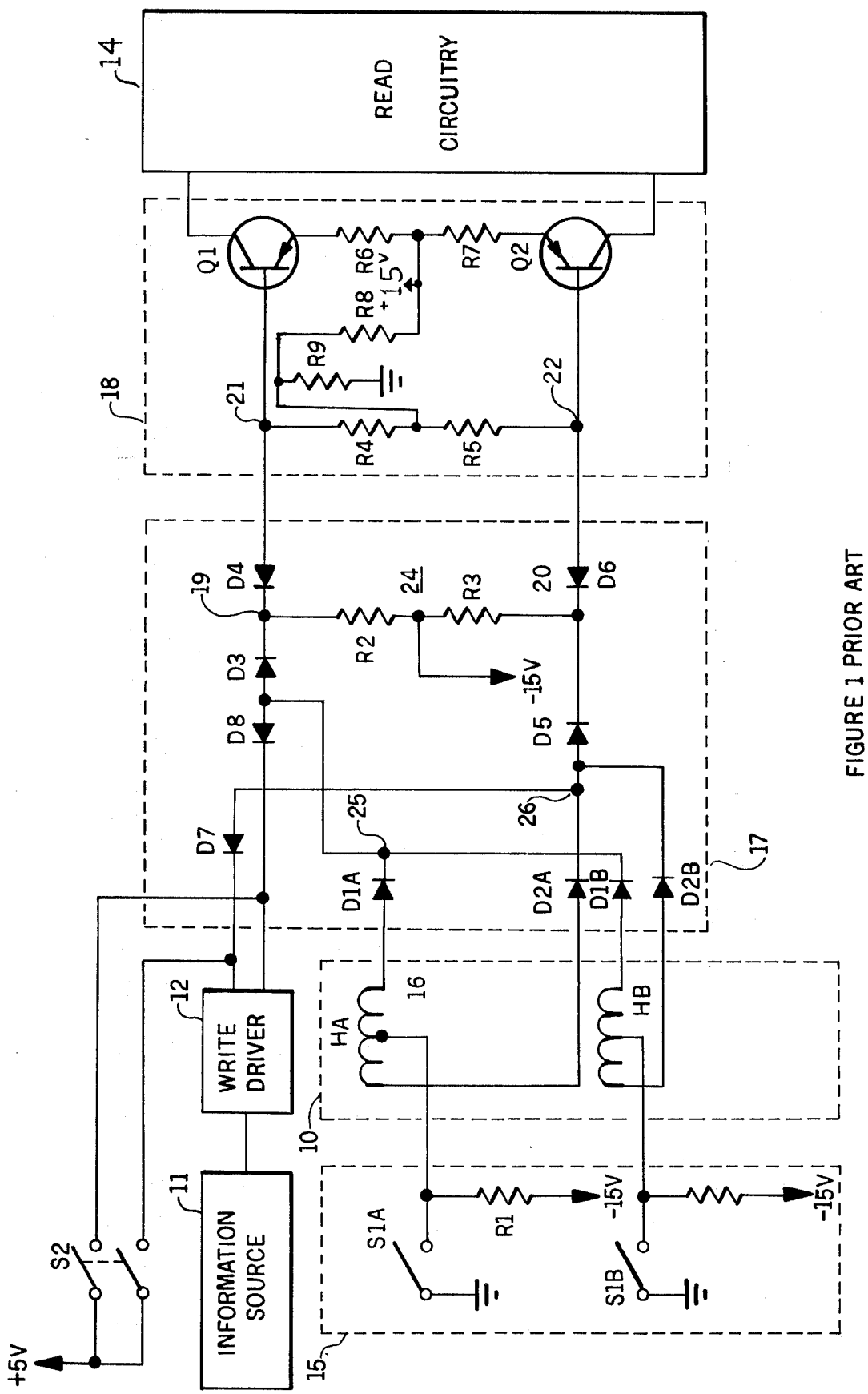
FIG. 1 shows a prior art switching circuit for magnetic heads.

In FIG. 1 is one example of a prior art switching device for reading and writing information through a selected one of a battery of magnetic recording heads 10. Information to be recorded is provided from a source 11 to a write driver 12 and information received from the heads during the reading mode is supplied to the read circuitry 14.

When the circuit is in the write mode, switch S2 is open such that the write driver 12 pulls current through either of the diodes D7 or D8. This current flow occurs because the write driver sets up voltage levels to draw current from ground through the coils and to the driver. This flow of current is caused by negative voltage in the write driver and the direction of flow is responsive to the polarity of the data pulse to be recorded. A head selection circuit 15 comprises a plurality of switches (one for each head) which can be closed individually to energize the specific head associated with the switch. For instance if the switch S1A is closed, the center tap 16 of the magnetic coil $H_A$ located in a magnetic head (not shown) is connected with ground. With switch S1A open, the center tap is connected through the resistor R1 to a minus 15 volts which is a lower potential than that of the write driver thereby preventing conduction through the diodes D1A and D2A of the diode matrix 17 associated with the head. Similarly, the head embodying the magnetic coil $H_B$ is energized by the closing of the switch S1B for conduction to the write driver through the diodes D1B and D2B.

When the circuit of FIG. 1 is in the read mode switch S2 is closed connecting the cathode of the diodes D7 and D8 to a plus 5 volts and thereby preventing conduction therethrough. The selection of the head through which the signal is to be read is achieved by the closing of one of the switches of the head selection circuit 15. For instance, with the closing of the switch S1A and passage of the magnetic head carrying the coil $H_A$ across a magnetic medium, current will flow through the circuit including the diode D1A, the diode D3 and the resistor R2 to the minus 15 volt terminal. Simultaneously current will also flow from the center tap 16 through the diode D2A, the diode D5 and the resistor R3 to the same minus 15 volt terminal. At the same time, current flows from the plus 15 volt terminal through the voltage divider of the resistors R8 and R9 to the resistor R4 and the diode D4 to the resistor R2 and the minus 15 volt terminal. Similarly current flows from the plus 15 volt terminal through the voltage divider of the resistors R8 and R9 to the resistor R5, the diode D6 and the resistor R3 to the minus 15 volt terminal to bias all the diodes on. The value of the electric currents flowing through the resistors R4 and R5 is dependent upon the voltages at the junctures 19 and 20 which voltages will vary in accordance with the direction of the flux pattern being encountered and detected by the coil $H_A$. For instance if the flux is climbing in one direction, the voltage of the terminal 19 will be slightly higher than that of the terminal 20 and if the magnetization and flux are in the opposite direction, the terminal 20 will be at the higher potential. The current through the resistors R4 and R5 in turn determine the voltage potential of the terminals 21 and 22 which controls the base voltage of the transistors Q1 and Q2. There thus exists a current flow from the plus 15 volt terminal through the resistor R6 and Q1 to the read circuitry 14 and also from the same terminal through the resistor R7 and Q2 to the read circuitry at a rate modulated by the voltages present at the junctures 21 and 22. In this manner, the direction of magnetization of the recording medium as detected by the flux encountered by the magnetic head coil is read by the read circuitry. The preamplifier 18 is necessary to provide sufficient amplification for effective detection of the differential voltages across the junctions 25 and 26.

As previously discussed, voltage spikes occur in the write circuit because of the reversal of current flow in the magnetic head coils during the normal writing process. The current either flows from the center tap 16 towards the diode D1A in the coil $H_A$, or towards the diode D2A depending upon the direction of current flow to the write driver in response to the binary number being recorded. The switching results in voltage spikes being generated within the circuit which can reach a value of 7 to 10 volts which voltage is sufficiently high to damage the transistors Q1 and Q2. The limiter circuit 24 thus is provided to protect the preamplifier transistors Q1 and Q2 against damage from these voltage spikes. The limiter circuit comprises the diodes D3 and D4 with the cathodes connected to the junction 19 and the diodes D5 and D6 having the cathodes connected to the junction 20. Thus during the writing process if the voltages in the write driver circuit are low the diodes D3 and D5 are always turned off because the junctures 19 and 20 are at a greater potential. If the values are high, the diodes D4 and D6 are turned off because of the back biasing of those diodes. In this manner the limiter circuit protects against excessive voltage spikes to the preamplifier circuit.

However during the reading mode, the reading voltage across the junctions 25 and 26, which junctions are common to all of the magnetic head coils, must pass through the circuits of the diodes D3 and D4 and D5 and D6, respectively. Due to the characteristics and imperfections in diodes there is a natural dissipation of the read signal upon passage through these diodes because of the presence of resistance and impedance. In addition, diodes cause noise in the signal further complicating the detection of the binary code. As a result, the low voltage read signal is somewhat dissipated and rendered less detectable because of the necessity of using the limiter circuit 24 for the protection of the read circuitry. It is the purpose of the present invention to provide an improved circuit which both protects the read circuit and diminishes the adverse effects on the read signals.

The circuit of FIG. 1 conforms to the block diagram of FIG. 2. Herein is shown the information source 11 supplying information to a write driver 12 which in turn passes the information through a read and write switching matrix corresponding to the components 15, 17 and 18 of FIG. 1. This matrix communicates with the bank of magnetic heads 10 for writing the information. In the reading mode, the correct head is addressed and the information also is fed through the matrix to a read amplifier 18 and on to the read circuit 14. Thus as can be noted, the read information and write information all pass through the read and write switching matrix with the attendant losses and contamination or distortion of the signal. As pointed out before, the attenuation is particularly critical in the reading mode in which the readback signal is not of a high strength.

The Invention

In accordance with the present invention, a circuit is provided for switching magnetic heads between the read and write mode wherein separate switching matrices are utilized for the reading circuitry and the writing circuitry such that the individual signals do not pass through the other matrices with the attendant losses and distortion.

Accordingly, one embodiment of the invention is shown in block diagram form in FIG. 3 wherein a magnetic recording system comprises the information source 11 and the write driver 12 with a read preamp 18 and a read circuit 14. Herein the write driver signal is fed directly into a write switching matrix 30 serving as a first switching means which communicates directly with the magnetic heads. Similarly a read switching matrix 31 or second switching means corresponds directly with the magnetic heads to supply the read signal to the read preamp 18. When one switching means is set, to connect the magnetic head circuit to the associated circuit, the remaining switching means is set to prevent a current exchange between its associated circuit and the magnetic heads. Thus it can be seen that the read signal in particular does not pass through the write switching matrix and there is no need for the previously used limiter which attenuated or otherwise distorted the read signal.

Figure 4:
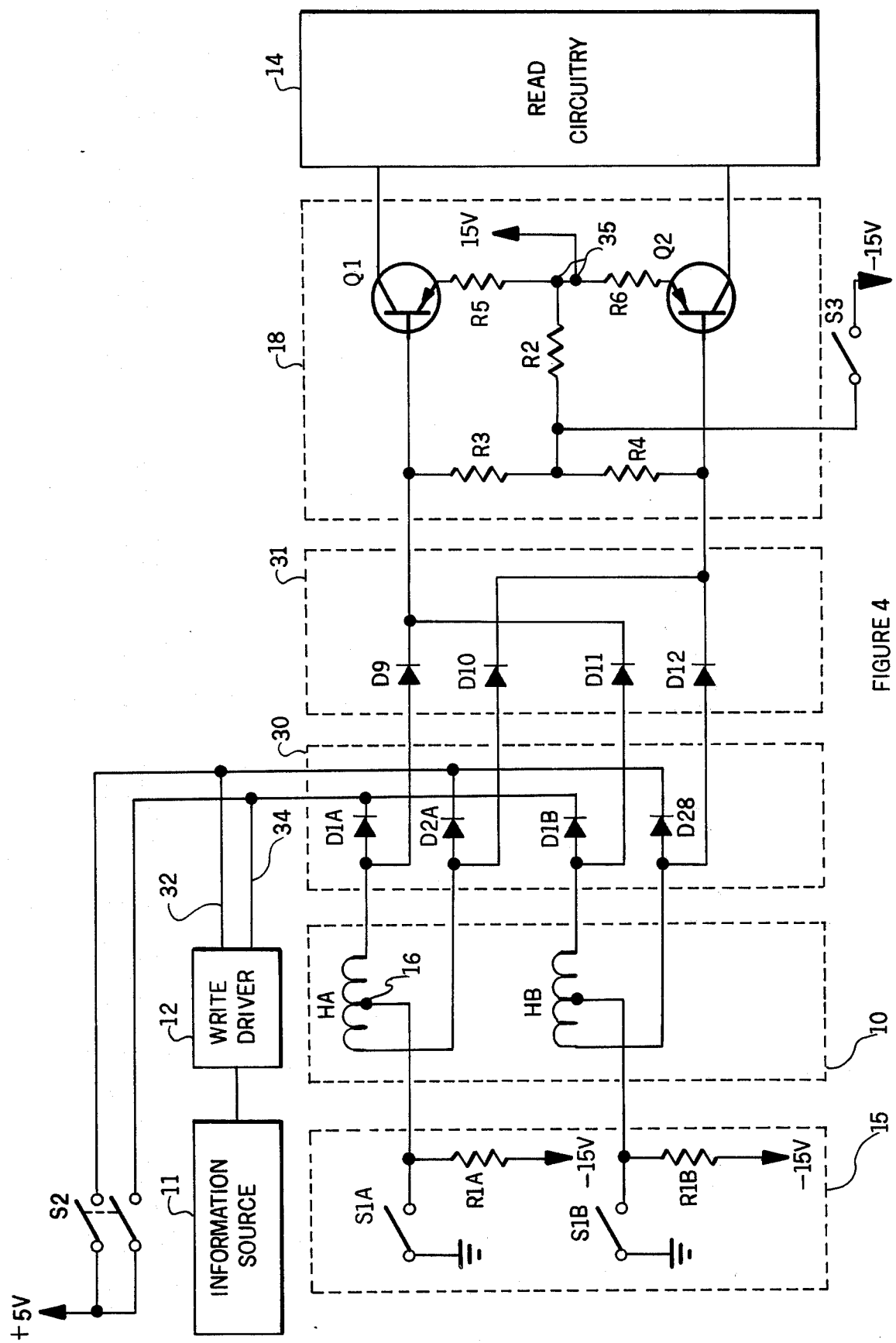
FIG. 4 is a magnetic head switching circuit embodying the present invention.

The circuit of FIG. 4 shows the invention in greater detail comprising the information source 11, the write driver 12, the read circuitry 14, the magnetic heads 10 and the magnetic head selection circuitry 15. As described previously, the write driver receives the information from the information source and supplies it through the conductors 32 and 34. If the head $H_A$ is to be selected for writing, the switch S1A is closed thereby shorting to ground the minus 15 volt signal connecting with the center tap 16 of the coil. Thus the diodes D1A and D2A of the write switching matrix 30 become conductive to permit current flow through the coil $H_A$.

During this same period of time the switch S3 is open thereby permitting the plus 15 volt potential at the junction 35 to be transmitted through the resistors R2, R3 and R4 to maintain the diodes D9 and D10 nonconductive. In this manner the voltage transients are prevented from reaching the transistors Q1 and Q2 in the preamplifier.

When the subject circuit of FIG. 4 is in the read mode the switch S2 is closed to provide a current path for any current passing from the write driver 12. At the same time the switch S3 is closed to permit the minus 15 volt source to turn on the read diode matrix or read switching matrix 31. With the closing of the switch S1A for selection of the head $H_A$ for reading, the diodes D9 and D10 become forward biased since the center tap 16 of the coil is at ground potential and the minus 15 volts is transmitted through the resistors R3 and R4 to the cathodes of those diodes. This same action also further enhances the reverse biasing of the diodes D1A and D2A to prevent any signal exchange from the write driver into the circuitry.

Thereafter with the generation of current in the coil $H_A$ the signal will pass through the diodes D9 and D10 directly to the bases of the preamplifier transistors Q1 and Q2 to modulate current flow therethrough. The transistor current flow results from the positive 15 volt potential at the terminal 35 and is modulated for supplying a signal to the read circuitry 14 responsive to the read signal detected by the head $H_A$. Thus as can be seen this read signal need only pass through one diode in each circuit leading to the preamplifier transistors with the resultant minimum losses and noise being interjected into the read system.

The invention claimed is:

1. A combined magnetic recording and reading system for recording data on and reading data from a magnetic recording medium, said system comprising:
   a read/write head capable of recording data on the magnetic recording medium responsive to electrical signals and for generating electrical signals responsive to reading data from the recording medium;
   a write driver circuit for generating electrical signals for causing the read/write head to record data on the medium;
   a read circuit for processing electric signals generated by the read/write head reading recorded data from the medium;
   a first switching circuit connecting the write driver circuit to the read/write head;
   a second switching circuit connecting the read circuit to the read/write head;
   switching means in the first and second switching circuits; and
   means for energizing said switching means operable to open the switching means in the first switching circuit while the read/write head is reading data and for opening the switching means in the second switching circuit when the read/write head is recording data thereby to prevent the electrical signals of the read circuit and write driver circuit from being transmitted through the other switching circuit.

2. A combined magnetic recording and reading system as defined in claim 7 wherein said switching means comprises diodes with means to back bias said diodes to prevent current flow through the associated switching circuit.

* * * * *